RE

No. 64.

E. ALLEN.

LOCK FOR FIREARMS.

Reissued Aug. 3, 1844

THE NORRIS PETERS CO., PHOTO-LITHO., WASHINGTON, D. C.

UNITED STATES PATENT OFFICE.

ETHAN ALLEN, OF NORWICH, CONNECTICUT.

IMPROVEMENT IN LOCKS FOR FIRE-ARMS.

Specification forming part of Letters Patent dated November 11, 1837; Reissue No. 60, dated January 15, 1844; Reissue No. 64, dated August 3, 1844.

*To all whom it may concern:*

Be it known that I, ETHAN ALLEN, late of Grafton, in the county of Worcester and State of Massachusetts, but now of Norwich, in the State of Connecticut, have invented certain new and useful Improvements in the Locks of Pistols and other Fire-Arms; and I do hereby declare that the following description and accompanying drawings, taken together, constitute a full and exact specification of my invention.

Figure 2:
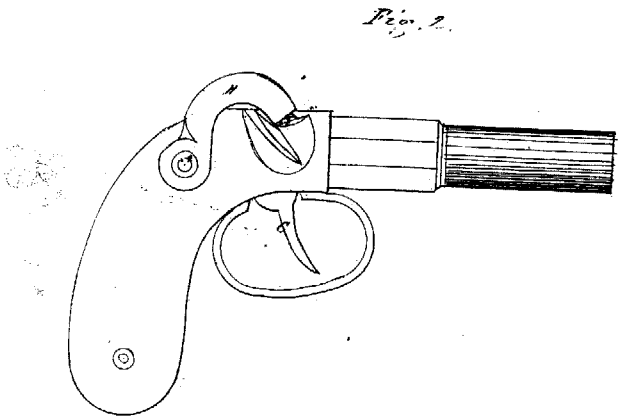
Figure 1:
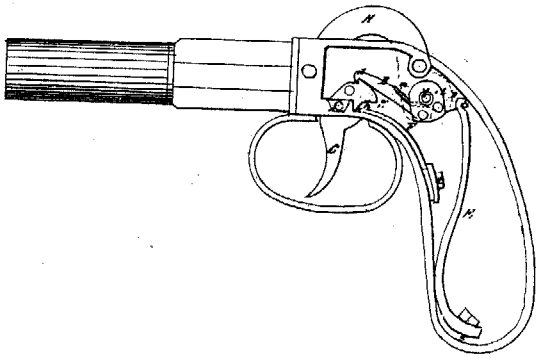

Of the drawings above mentioned, Figure 1 represents the interior of the breech or rear or handle part of a pistol, in which the several members of my improved lock are duly exhibited in their relative positions to each other, while Fig. 2 is an elevation of the opposite side of the pistol, or that on which the percussion hammer or cock is situated.

The cock H, Figs. 1 and 2, is represented in the drawings in its usual position, or as resting upon the nipple I, on which the exploding-cap is placed. It (the cock) is attached in the usual way to the end of one of the journals of a tumbler, A, or to the said tumbler in any convenient and proper manner. That part of the rear side of the tumbler which is just below the journal *b*, on which the tumbler turns, has one end of a small stirrup, D, jointed to it, the other end of the said stirrup being suitably connected to the top or upper part of the mainspring E, arranged as seen in the drawings. The lower part of the anterior or front side of the tumbler has the rear extremity of a dog or catch, B, jointed to it in such manner as to permit the opposite end of the catch to move in a vertical plane when actuated by the trigger C. The front end of the catch has a small acute-angular shoulder or hook, *d*, formed upon its lower side, as seen in the drawings, against which shoulder a corresponding angular projection, *e*, of the trigger C abuts and operates. The trigger turns on a fulcrum, *f*, in the usual manner, and it is on that part (or the sear) of it above the said fulcrum that the projection is formed. The part *g* of the sear is shaped somewhat in the ordinary manner, or projects a sufficient distance beyond the arc of a circle (struck from the center of the fulcrum *f* as a center, and with a radius equal to the distance between the end of the projection *e* and the center of the fulcrum) to bear against the lower side of the catch, and when the trigger is pulled to throw or force the hook *d* entirely above the projection *e* of the trigger. In other words, that part of the upper or rear edge of the sear of the trigger which is in opposition with the lower side of the catch B, has a cam shape, so that when the finger is applied to the lower leg or part of the trigger and draws the trigger rearward the catch B will be impelled forward, and as it advances the upper part of the sear will gradually elevate the catch or throw the hook *d* thereof upward until it rises above the projection *e*, and is retracted by the force of the mainspring E. As the dog or catch B is moved forward by the trigger, it draws up on the lower part of the tumbler and elevates the cock H above the nipple or percussion-cap thereon, and as soon as the catch escapes from the trigger the tumbler is drawn back by the mainspring and the cock thrown down upon the nipple, so as to explode the cap thereon. Thus it will be seen that at each recession of the lower part of the trigger the cock or hammer is raised from and thrown upon the cap; or, in other words, the pistol is cocked and discharged. After each discharge, the upper part of the trigger is retracted by means of a spring, F, one end of which is secured to the pistol-frame by a screw, *a*, while the other bears in a notch, *h*, formed in the rear part of the sear of the trigger, or just in rear of the fulcrum thereof. The catch B should be pressed down upon the trigger by the action of a spring, *x*, applied to it and the tumbler in any convenient manner.

My lock, the several parts of which and the particular office of each part of which hav been hereinbefore fully described, is so cor trived that when applied to a pistol or any other fire-arm the whole operation of raising the cock from and throwing the same down upon the percussion-cap or the nipple is performed by the finger applied to the trigger alone, and after each retraction of the trigger and release therefrom of the retractile force an immediate restoration or reannexation of the parts shall at once take place (by the action of the mechanism) to such degree as to adapt the lock for another pull of the trigger or a succeeding discharge, and the whole of the same, without rendering any of the usual or other or preparatory acts necessary in order to adjust the parts previous to the cock being thrown down upon the cap. The tumbler, as in all or nearly all locks, must partially revolve or otherwise move, and when it so revolves or moves in one direction it must carry with it the end of the mainspring and bring the said spring to such a degree of tension that when the force by which the tumbler is moved is withdrawn therefrom the retractive power of the spring shall suddenly draw and move the tumbler in an opposite direction and generate therein a sufficient momentum to give the requisite blow upon the cap to insure an explosion thereof. The tumbler and the trigger must have such a mechanical connection as will enable the mainspring to be brought to the necessary degree of tension by means of the finger applied to the trigger, as the whole of the mechanism is put in motion when the trigger is pulled; and the said mechanical connection must be of such character that when the lower end of the trigger is moved backward it shall draw after it or give motion to the tumbler and mainspring until the cock is sufficiently raised and the mainspring has a sufficiently retractive power generated in it. This being accomplished, some provision or contrivance must be employed to suddenly disconnect the trigger and tumbler, so as to permit the mainspring to throw the cock down upon the percussion-cap.

The mechanical connection above alluded to is what I have heretofore denominated the "dog" or catch B, and the shoulder or notch formed upon the upper part of the trigger or upon the tumbler, when the dog is jointed to the trigger or otherwise suitably connected therewith.

The provision or contrivance, above alluded to, for the purpose of disconnecting the trigger and tumbler consists in a cam or projection formed upon the rear part of the upper end of the trigger; or in some cases upon the dog or catch; in others upon the tumbler; and in others the said cam extends from or makes part of the lock-case or breech of the pistol or gun, the said cam or projection being placed in such position and upon such part of the lock and so formed as circumstances may render necessary. The peculiar purpose of the cam or projection is to throw the hooked end of the dog out of or away from the notch or shoulder of the trigger or tumbler, as the case may be. The cock being raised from and driven down upon the percussion-cap in the manner and by the means above described, it next becomes necessary to throw the lower end of the trigger forward far enough to cause the hooked end of the dog or catch to again rest upon or engage with the shoulder or notch of the trigger or tumbler, as the case may be; and this is at once accomplished by a spring, which is fitted at one end to any convenient or proper part of the lock or its case, and at the other bears upon a shoulder formed upon the upper part of the trigger and in rear of the fulcrum thereof. When the trigger is pulled by the finger, the spring will be raised and sufficient force generated therein to throw the lower end of the trigger forward, so as to draw the upper end back to the extent sufficient to engage the dog or catch with the shoulder of the trigger or tumbler, as the case may be.

The spring F, by which the trigger is actuated, not only performs the same office that a spring does when applied to a trigger of an ordinary percussion-lock, but is employed for another purpose—viz., that of drawing back the shoulder or notch of the sear of the trigger far enough to permit the spring $x$ to force the catch down, so as to engage with the said shoulder or notch. For this purpose a spring or some other mechanical equivalent is necessary; and for convenience of construction and arrangement of the mechanism I embody this spring in the spring F, so that, besides the ordinary duty of a trigger-spring, the said spring performs another—viz., that of reconnecting the shoulder or notch of the sear with the catch, or of restoring the said parts to the position required for a succeeding pull of the trigger. Such a restoring-power, whether connected directly with or making part of the spring F, or separated from it, and acting independently of it, makes part of my invention, or is an auxiliary thereof, which cannot be dispensed with, in order to render its operation as perfect and extensive as above described.

There are various methods of modifying or arranging and forming the above mentioned operative parts. For instance, the position of the cock or tumbler may be reversed—that is to say, it may be turned downward, and the trigger placed in rear of and below it, and connected with the tumbler by means of a dog or catch jointed to the upper part of the trigger and below its fulcrum, and hooking or engaging with a notch or shoulder formed upon the tumbler or cock; or the said dog or catch may be jointed to the cock or tumbler and hook upon or engage with a notch or shoulder formed upon the trigger; and the said dog or catch may at the proper time be thrown out of connection with the notch or shoulder by means of a cam arranged in any of the modes above mentioned, and which is most suitable for the purpose.

I do not deem it necessary to enumerate all these different modes of accomplishing the elevation and depression of the cock and immediate restoration of the parts to their requisite positions for the next discharge, and by a power or powers generated within them or any part or parts of them, as I deem them only as so many variations in the construction, effecting no change in the principle of my invention or the nature thereof, but being such as the law allows me to make and prohibits others from making.

In the conclusion of this description of my invention, I would remark that I believe myself to have first discovered that the tumbler and trigger could be so connected with each other by machinery, (substantially as described,) and disengaged from each other by the action of machinery and the finger, (so applied to the leg of the trigger as to retract it sufficiently,) that each retraction thereof would produce the above-explained necessary and opposite motions of the tumbler and cock; and each release of the retractile force from the trigger-leg causes the trigger and tumbler to be reunited or reconnected by the action of the machinery alone.

Having thus described the nature of my invention and the principles upon which it acts, that which I claim, and desire to secure by Letters Patent, is as follows—that is to say:

A mechanism for elevating the cock from the nipple by a simple pull of the trigger, in combination with a mechanism which so separates certain parts during and by the said pull of the trigger as to permit the cock to be thrown down upon the nipple by the reaction of the mainspring, all as set forth, and a mechanism that, by the said pull of the trigger, has a power generated within it, which, on the release of the retractile force or finger from the trigger, shall immediately reannex the disconnected parts, or restore them to their requisite positions for the accomplishment of another discharge by another pull of the trigger, as explained, the whole being arranged and operating substantially as hereinbefore specified.

ETHAN ALLEN.

Witnesses:
CHAS. THURBER,
MARY A. MURRAY.